United States Patent
Lelong et al.

(10) Patent No.: US 7,095,881 B2
(45) Date of Patent: Aug. 22, 2006

(54) PROCESSING METHOD AND SYSTEM FOR 3-D GEOMETRIC MODELING OF THE SPINE

(75) Inventors: Pierre Lelong, Nogent sur Marne (FR); Olivier Gerard, Paris (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 858 days.

(21) Appl. No.: 09/761,254

(22) Filed: Jan. 16, 2001

(65) Prior Publication Data

US 2001/0026637 A1 Oct. 4, 2001

(30) Foreign Application Priority Data

Jan. 14, 2000 (EP) .......................... 00400102

(51) Int. Cl.
- *G06K 9/00* (2006.01)
- *G06K 9/36* (2006.01)
- *G06K 9/32* (2006.01)

(52) U.S. Cl. .................. 382/132; 382/382; 382/287; 382/294

(58) Field of Classification Search ........... 382/131, 382/132, 287, 294; 600/425
See application file for complete search history.

(56) References Cited

U.S. PATENT DOCUMENTS

| | | | | |
|---|---|---|---|---|
| 4,920,573 A | * | 4/1990 | Rhodes et al. | 382/131 |
| 5,483,960 A | * | 1/1996 | Steiger et al. | 600/425 |
| 5,531,227 A | * | 7/1996 | Schneider | 600/425 |
| 5,623,560 A | * | 4/1997 | Nakajima et al. | 382/295 |
| 6,434,415 B1 | * | 8/2002 | Foley et al. | 600/425 |

OTHER PUBLICATIONS

"Approach for the smooting of three–dimensional reconstructions of the human spine using dual Kriginginterpolation" by B. Andre, F. Trochu, J. Dansereau, in Medical & Biological Engineering & Computing, May 1996, pp. 185–191.

"Morphometric evaluations of personalised 3D reconstructions and geometric models of the human spine" by C. .E. Aubin, J. Dansereau, F. Parent, H. Labelle and J.A. de Guise in Medical & Biological Engineering & Computing, Nov. 1997, pp. 611–618.

Y. Petit et al: ▌ Estimation of 3–D Location and Orientation of Human Vertebral Facet Joints from Standing Digital Radiographs▌ , ▌ Medical & Biological Engineering & Computing▌ , Jul. 1998, pp. 389–394.

Y. Petit et al: Estimation of 3–D Location and Orientation of Human Vertebral Facet Joints from Standing Digital Radiographs , Medical & Biological Engineering & Computing , Jul. 1998, pp. 389–392.

Y. Petit et al: Estimation of 3–D Location and Orientation of Human Vertebral Faucet Joints from Standing Digital Radiographs , Medical & Biological Engineering & Computing , Jul. 1998, pp. 389–394.

* cited by examiner

*Primary Examiner*—Mehrdad Dastouri

(57) ABSTRACT

An image processing method for providing three-dimensional geometric modeling of the spine, using a biplanar image reconstruction, comprising steps of acquisition of a first view (F) of a part of the spine, and a second view (L) of the same part of the spine taken from a different angle around the longitudinal axis of the spine, matching the dimensions of the views (F,L) from two predetermined corresponding landmarks (P1, P2) on each view and deriving three-dimensional coordinates (z, x, y) of corresponding points (P) along the spine. Application: X-ray medical 3-D imaging.

10 Claims, 3 Drawing Sheets

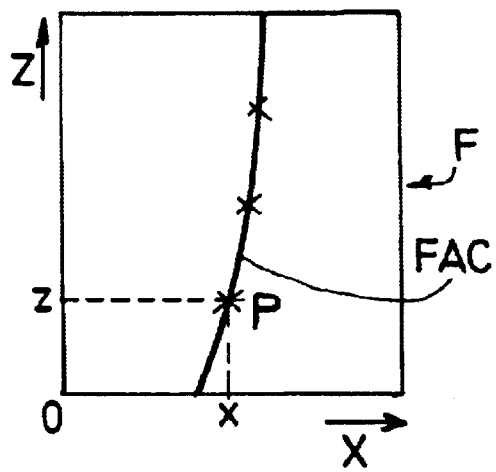
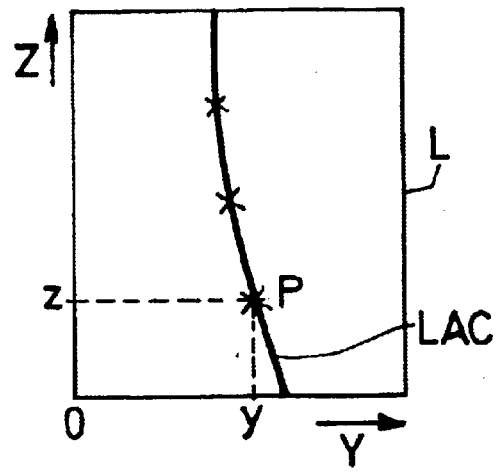
FIG. 3A    FIG. 3B
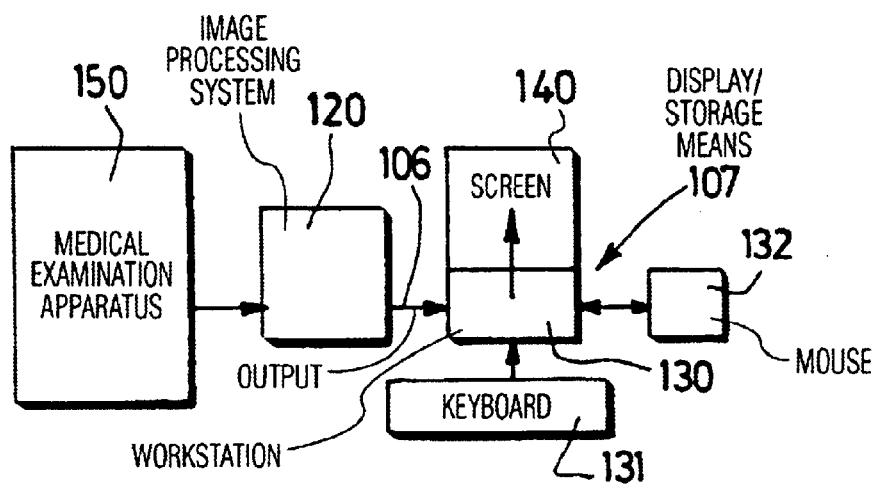
FIG. 4

PROCESSING METHOD AND SYSTEM FOR 3-D GEOMETRIC MODELING OF THE SPINE

The invention relates to an image processing method and a system carrying out this method in order to provide three-dimensional geometric modeling of the spine from a biplanar image reconstruction.

It has been found that clerical evaluation and diagnostic related to scoliosis need 3-D geometric modeling of the spine because scoliosis is a 3-D deformity of the spine.

The invention finds an application in digital radiography for image processing views of the spine in order to provide new images appropriate to help diagnosing scoliosis.

A method of 3-D geometric modeling of the spine from a biplanar image reconstruction is already known of the publication "Estimation of 3-D location and orientation of human vertebral facet joints from standing digital radiographs", by Y. Petit, J. Dansereau, H. Labelle and J. A. de Guise, in "Medical and Biological Engineering and Computing, July 1998 (Received Jan. 6, 1998). This publication discloses a biplanar radiographic reconstruction method of volumes of interest to evaluate the location, dimensions and orientation of human facet joints. The method comprises the determination of Areas Of Interest, denoted by AOI, in a given vertebra. The AOI is for instance in the shape of a parallelogram, which includes the entire facet joint in order to give a good estimation of its location, dimension and orientation, and which is defined by its four extremities on two digital radiographs: a postero-anterior (PA) and a lateral (L) digital views. The visibility of the four extremities and selected landmarks is graded using a six-point scale. For 3-D reconstruction an algorithm known of those skilled in the art as direct linear transformation (DLT) is used. Using this method, the 3-D image of the vertebra is reconstructed from the two 2-D images of the vertebra. The extremities of the AOI estimated on the PA and L views are reconstructed with the same DLT algorithm in order to define the boundaries of the AOI, and of the corresponding volume of interest denoted by VOI. Such a geometrical representation of VOI is considered to give an adequate estimation of facet joint location, dimensions and sagital plane orientation. This method permits of studying individual deformations of each vertebra.

For diagnosing scoliosis, the study of the particular deformation of each vertebra comes at an already advanced stage of the patient's follow-up, or is applied to deformations limited to a given zone of the spine. A more primary diagnosis is related to the global shape of the spine, which might permit of determining either that the deformity is local or that the deformity is global, and so might permit of determining the breadth of the disease.

To that end, it is a purpose of the invention to provide an image processing method for the three-dimensional (3-D) geometric modeling of the axis of the spine. Such a 3-D modeling supplies the global shape of a part or of the totality of the spine axis and permits of determining the 3-D location and the amplitude of the spine deformity at said location. It is also a purpose of the invention to provide such a method that is as simple as possible in order to permit practitioners, who are skilled in the medical field but are no specialists in the image processing field, of easily obtaining the required results. It is also a purpose of the invention to provide such a method that may be carried out with inexpensive means in order not to be limited in use by cost problems.

Such an image processing method is claimed in Claim 1.

It is to be noted that, at the present time, image processing packages for the spine are, among digital packages, the ones which are the most required in radiology. As a matter of fact, scoliotic patient follow-up is usually done over a long period of time, from which it results that a large number of X-ray examinations is needed and that the total dose of X-ray exposure may be eventually important. Digital radiography reduces the X-ray exposure because the quality of the image is improved with respect to standard film radiography. Until now, only 2-D image processing packages were currently used. As scoliosis is a 3-D deformity of the spine, now 3-D image processing packages are needed.

An advantage of the 3-D geometric modeling of the axis of the spine according to Claim 1 lies in that this modeling is obtained in a very cheap and quick manner usable by every radiologist. Only two standard two-dimensional (2-D) digital views of the spine are needed and the 3-D image of the global spine axis is obtained by image processing as soon as the radiologist has set of few points for landmarks on each of the 2-D digital views. This operation of landmark setting is not complicated and is usable by an operator such as a radiologist having no special skill in the field of drawing with computer means.

The invention is described hereafter in detail in reference to diagrammatic figures, wherein:

FIG. 3A and FIG. 3B illustrate the determination of the 3-D co-ordinates of points on the smoothed central line of the spine;

FIG. 4 represents an X-ray imaging system to carry out the method.

Figure 1B:
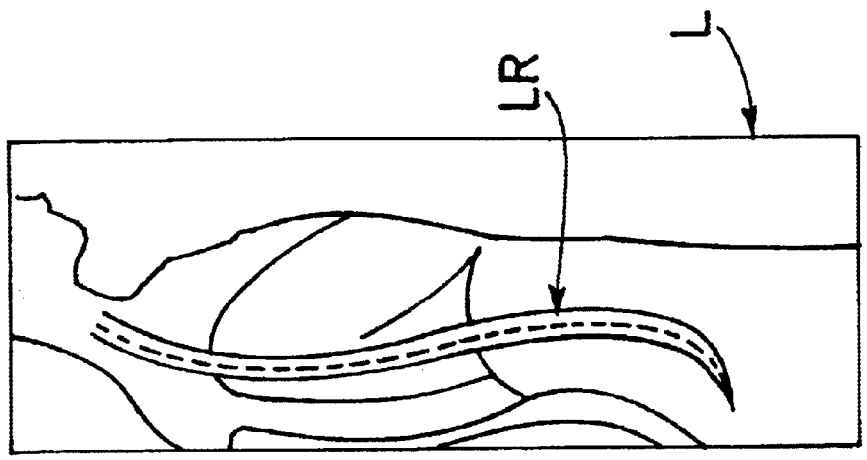
FIG. 1B is a lateral X-ray view of a human body representing the totality of the spine.
Figure 1A:
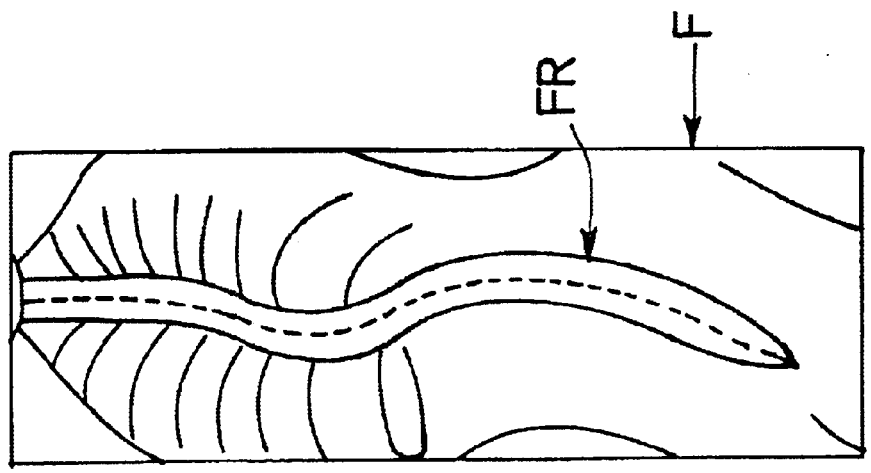
FIG. 1A is a frontal X-ray view of a human body representing the totality of the spine.
Figure 2A:
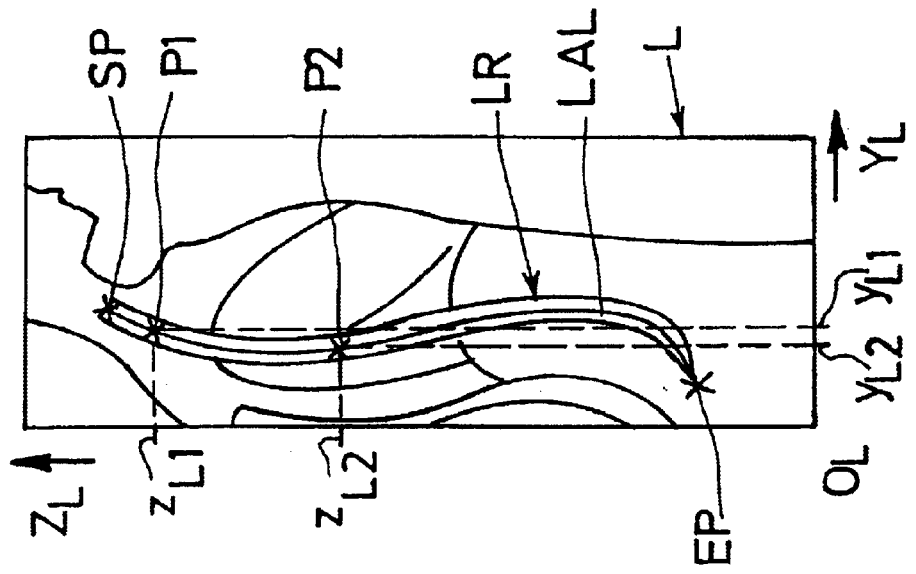
FIG. 2A and FIG. 2B show the X-ray views of FIG. 1A and FIG. 1B on which central lines have been drawn on the representation of the spine.
Figure 2B:
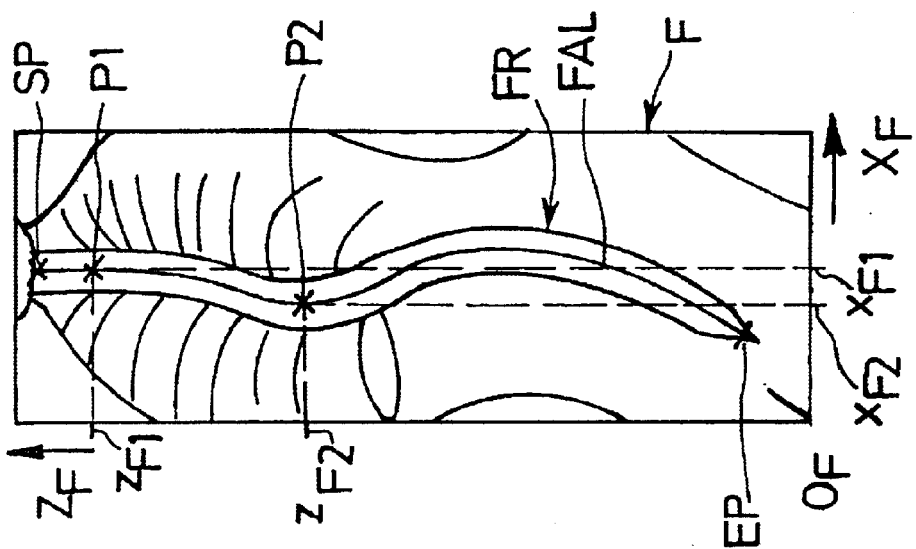

The invention relates to an image processing method and a system carrying out this method in order to provide three-dimensional geometric modeling of the spine from a biplanar image reconstruction. The method comprises steps of:

a) Referring to FIG. 1A, acquiring a first global radiographic digital lateral view of the spine, referred to as L digital view; and, referring to FIG. 1B, acquiring a second global radiographic digital front view of the spine, referred to a F digital view. Each of these views shows the spine as may generally be regarded as a non straight ribbon, having a non zero width and which is substantially symmetrical with respect to a virtual axial line following the axis of the bodies of the vertebrae. In FIG. 1A and FIG. 1B this ribbon virtual axial line is represented by a doted line. The spine ribbon is denoted by FR in the front view and by LR in the lateral view.

b) Referring to FIG. 2A and FIG. 2B, drawing a real axial line coinciding at best with said virtual axial line. In FIG. 2A and FIG. 2B this ribbon real axial line is represented by a continuous line, which is denoted by FAL in the front view and by LAL in the lateral view. This operation may be performed using a standard digital drawing means comprising a standard drawing program of a computer station having display means to visualize the digital F and L digital views, and having a mouse or a key board or other control means to control the drawing program of the computer station. For example, using the mouse and the drawing program, a piece-wise linear curve is drawn from one first point referred to as start point, denoted by SP, situated for example on the axis of first upper vertebra, following downward the axes of different vertebrae pointing on said axes as best as the operation may estimate, until on last point referred to as end point, denoted by EP, on the last lower vertebra, is reached. Such a piece-wise line is drawn on each of the F and L digital view.

c) A matching step for matching points of the F and L digital views. In this step, two points referred to as first landmarks, denoted P1 and P2, are selected on one of the views, for instance the F digital view, and two respectively corresponding points referred to as second landmarks, so also denoted P1 and P2, are selected on the other view, for instance the L digital view. These landmarks P1 and P2 are set using the control means, mouse or keyboard or other control means, of the computer station. Such an operation is easily feasible by a practitioner having a good knowledge of the anatomical specificity of the spine, which is of course the case of the radiologist using the present process. This matching step is performed using a matching algorithm for estimating a scale factor and a translation factor for matching the two views. A simple matching algorithm may comprise the definition of systems of orthogonal reference axes for each view F and L, for instance a first system $X_F$, $Z_F$ for the front view F and a second system $Y_L$, $Z_L$ for the lateral view L; in said systems, the first point P1 has for co-ordinates $(X_{F1}, Z_{F1})$ and $(Y_{L1}, Z_{L1})$; the second point P2 has for coordinates $(X_{F2}, Z_{F2})$ and $(Y_{L2}, Z_{L2})$; by writing the linear parametric relations linking the coordinates of the landmarks P1 and P2 in each plan of view F and L, in the two systems of coordinates $X_F$, $Z_F$, and $Y_L$, $Z_L$, it is possible, as known of those skilled in the art, to determine the parameters of said parametric relations. These parameters are the scale factor and the translation factor, which make the two systems of coordinates $X_F$, $Z_F$, and $Y_L$, $Z_L$ coincide. The matching of the two systems of co-ordinates provides a unique system of coordinates for the two views, denoted X, Y, Z.

d) Spline calculation based on the data of each piece-wise line of the F and L digital views. The splines are known of those skilled in the art to be piece-wise curves whose pieces are associated while respecting derivative continuity. This spline calculation is performed using a spline estimation module, which performs mathematical modeling of each drawn piece-wise linear curve and supplies new digital smoothed curves, referred to as FAC and LAC in the front and lateral views, said curves being constructed with interpolated values provided between the points of said piece-wise linear curve previously set by the control means of the drawing program.

e) Referring to FIGS. 3A, 3B sampling of the new digital smoothed curves. Points are extracted from the new digital smoothed curves at periodically determined ordinates denoted by z. So, referring to FIG. 3A, and the F view, a corresponding x coordinate is determined for each z coordinate. And referring to FIG. 3B and L view, a corresponding y coordinate is determined for each z coordinate.

f) Construction of the global spine axis 3-D image. This 3-D image is constructed using the points whose coordinates are the z, x, y values estimated in the previous step.

This 3-D image of points may be displayed on the screen of the computer station using a 3-D standard program.

g) From the coordinate values z, x, y, numerous diagnostic parameters may be derived, particularly interesting parameters to be derived are those providing the geometrical torsion of the axis of the spine, which permits of evaluating the degree of deformity of the spine.

From those parameters associated with the 3-D image of the graphic line simulating the axis of the spine, the practitioner or the radiologist can qualitatively and quantitatively evaluate the distortion or non-distortion of the spine and derive therefrom the presence and seriousness of scoliosis. These results are obtained very quickly with only two standard digital global views of the spine and very simple image processing steps.

It may be needed that the first and second views represent the total length of the spine. The invention may also be applied to views representing a same partial length of the spine.

Referring to FIG. 4, a system for carrying out the above-described method is represented. The image data of two R-ray views, provided for instance by a medical examination apparatus 150, are further provided to an image processing system 120 for processing the data according to the steps of the above-cited method. This image processing system 120 may be a suitably programmed computer, a processor of a workstation 130, or a special purpose processor having circuit means that are arranged to perform the functions of the method steps according to the invention. The workstation 130 may also comprise a screen 140, and a keyboard 131 and a mouse 132 referred to as control means for particularly controlling the drawing of the lines FAL and LAL and the setting of marker points to represent the landmarks SP, EP, P1, P2 and the points P on the lines FAC and LAC. The processing system may be connected to storing means to store the medical images.

The X-ray medical examination apparatus 150 may comprise an X-ray source, a table for receiving a patient to be examined, an optical system for providing image data to the processing system 120 which has at least one output 106 to provide image data to display and/or storage means 107. The display and storage means 107 may respectively be the screen 140 and the memory of a workstation 130 as described in relation to FIG. 4. Said storage means may be alternately external storage means.

The suitably programmed computer, the processor of the workstation 130, or the special purpose processor with circuit means, use computer program products comprising sets of instructions for carrying out the method of the invention.

What is claimed is:

1. An image processing method for providing three-dimensional geometric modeling of the spine, using a biplanar image reconstruction, comprising:

acquiring a first digital view (F) of a part of the spine;

acquiring a second digital view (L) of the same part of the spine taken from a different angle around the longitudinal axis of the spine, wherein each of the first and second digital views of the spine include a spine ribbon having a non-zero width and being substantially symmetrical with respect to a virtual axial line along an axis of vertebrae bodies of the spine in respective first and second digital views;

drawing a real axial line (FAL, LAL) for each of the first and second digital views coinciding with the virtual axial line of the corresponding spine ribbon in a respective one of the first and second digital views, the real axial line being represented by a continuous line and wherein drawing the real axial line includes an operator using a control means to control a drawing program, to digitally draw each real axial line (FAL, LAL) as a piece-wise linear curve drawn from a start point to an end point along an estimate of the virtual axial line of the corresponding spine ribbon;

matching the dimensions of the digital views (F,L) from two predetermined corresponding landmarks (P1, P2) on each digital view set by the operator using the control means, wherein matching includes estimating a scale factor and a translation factor to make a system of coordinates for each digital view coincide, to provide a unique system of coordinates for the first and second digital views;

performing a spline calculation to provide a smoothed axial line (FAC, LAC) on each digital view, the spline calculation including mathematical modeling of the operator drawn piece-wise linear curves of the first and second digital views for supplying respective new digital smoothed curves, the new digital smoothed curves being constructed with interpolated values provided between points of the respective piece-wise linear curves; and deriving three-dimensional coordinates (z, x, y) of corresponding points (P) along the spine as a function of the smoothed axial lines (FAC, LAC).

2. The image processing method as claimed in claim 1, wherein two landmarks (P1, P2) are set on the real axial line on each digital view.

3. The image processing method as claimed in claim 2, wherein the matching of the dimensions of the two digital views is performed by a calculating matching coordinates for the two corresponding landmarks (P1, P2).

4. The image processing method as claimed in claim 3, wherein a common system of coordinates (Z, X, Y) is determined for the two digital views, from the matched coordinates of the two corresponding landmarks.

5. The image processing method as claimed in claim 2, wherein three-dimensional coordinates (z, x, y) of corresponding points along the spine are determined for points (P) regularly spaced along the axis of coordinates (Z) corresponding to the longitudinal axis of the spine.

6. The image processing method as claimed in claim 2, wherein the common system of coordinates is an orthogonal system, the first digital view is a frontal view (F), the second digital view is a lateral view (L) orthogonal to the frontal view, with a common axis (Z) in the direction of the longitudinal axis of the spine, a second axis (X) parallel to the frontal plane of view and the third axis (Y) parallel to the lateral plane of view.

7. An imaging system having acquisition means for acquiring a first and a second digital view of the spine, having display means to display the two digital views of the spine, having drawing means to draw real axial lines of the spine and to set predetermined corresponding landmarks on each digital view and having processing means to calculate three-dimensional coordinates of points along the spine according to the method as claimed in claim 1.

8. The imaging system as claimed in claim 7, wherein the processing means comprise a suitably programmed computer of at least one selected from the group consisting of a workstation and a special purpose processor having circuit means, which are arranged to process image data according to the method as claimed in claim 1, and wherein the display means display images processed according to said method, further comprising means to store the image data.

9. An X-ray examination apparatus having a system as claimed in claim 7.

10. A computer program product embodies in a computer readable medium comprising a set of instructions for carrying out the method as claimed in claim 1.

* * * * *